United States Patent [19]
Grage et al.

[11] Patent Number: 5,210,586
[45] Date of Patent: May 11, 1993

[54] ARRANGEMENT FOR RECOGNIZING OBSTACLES FOR PILOTS OF LOW-FLYING AIRCRAFT

[75] Inventors: Ludger Grage, Eichenau; Wolfgang Kranz, Munich, both of Fed. Rep. of Germany

[73] Assignee: Siemens Aktiengesellschaft, Munich, Fed. Rep. of Germany

[21] Appl. No.: 713,876

[22] Filed: Jun. 12, 1991

[30] Foreign Application Priority Data

Jun. 27, 1990 [DE] Fed. Rep. of Germany ....... 4020469

[51] Int. Cl.⁵ .................. G01C 3/08; G01B 11/26; H04N 7/18
[52] U.S. Cl. ...................................... 356/5; 356/152; 358/109
[58] Field of Search ............ 356/5, 152; 180/169; 358/109

[56] References Cited

U.S. PATENT DOCUMENTS

| | | |
|---|---|---|
| 4,068,124 | 1/1978 | Kleider . |
| 4,501,961 | 2/1985 | Stauffer . |
| 4,572,662 | 2/1986 | Silverman . |
| 4,770,482 | 9/1988 | Sweeney et al. . |
| 4,902,126 | 2/1990 | Koechner . |

FOREIGN PATENT DOCUMENTS

| | | |
|---|---|---|
| 2402537 | 7/1975 | Fed. Rep. of Germany . |
| 1494561 | 12/1977 | United Kingdom . |

*Primary Examiner*—Stephen C. Buczinski
*Attorney, Agent, or Firm*—Hill, Steadman & Simpson

[57] ABSTRACT

An arrangement working according to the laser radar principle comprises a pulsed laser range finder (LEM) for scanning a given field of view and for the pictorial presentation of the course of a perceived obstacle for the pilot on a display, whereby a respective array of semiconductor laser diodes or, respectively, of receiving detectors is provided as a transmitter and as a receiver of the laser range finder and the scanning of the field of view occurs with a mesh network-like pattern. As a result of these measures, the expense for the individual components of the arrangement is minimized and a simple, compact structure is achieved. The arrangement is suitable for obstacle warning for aircraft, particularly for low-flying helicopters.

28 Claims, 4 Drawing Sheets

ARRANGEMENT FOR RECOGNIZING OBSTACLES FOR PILOTS OF LOW-FLYING AIRCRAFT

BACKGROUND OF THE INVENTION

Field of the Invention

The present invention relates to an arrangement for recognizing obstacles such as, for example, overhead lines, wire cables, pylons and the like, for pilots of low-flying aircraft, particularly helicopters, comprising a pulsed laser range finder composed of a transmitter and a receiver for scanning a field of view and for the pictorial display of the course of the recognized obstacle.

A basic arrangement of this type is disclosed in the German published application 24 02 537.

Low-flying aircraft such as, for example, helicopters, being used for close ground support are jeopardized for obstacles such as, for example, overhead lines, wire cables of cable ways, pylons and the like, that hardly be perceived by a pilot, particularly at night or given poor visibility conditions. Warning devices that operate according to the laser radar principle have already been proposed for recognizing such obstacles. In the arrangement disclosed in the aforementioned German published application 24 02 537, the scanning of the terrain of interest occurs in concentric circles or helically with a laser beam of a pulsed laser range finder composed of a transmitter and a receiver. The course of the recognized obstacle is portrayed, with respect to the helicopter, for example, on a picture screen. Scanning a given field of view with a single laser beam, however, requires a relatively-great amount of time. Moreover, involved components such as, for example, a laser having a high pulse repetition frequency and a complicated scanner mechanism having a high scan mirror frequency in azimuth and elevation are required for this purpose. This equipment expense has an unbeneficial influence on the size and weight of the arrangement.

SUMMARY OF THE INVENTION

It is the object of the present invention, therefore, to provide in an arrangement of the type initially set forth, a structure by which one may achieve an optimally-simple, compact structure and to keep the expense for the individual components as low as possible in recognizing obstacles such as overhead lines, wire cables, pylons and the like for pilots in low-flying aircraft.

In an arrangement of the type initially set forth, the object set forth above is achieved, according to the present invention, in that an array of semiconductor laser diodes or, respectively, of receiver detectors is respectively provided as a transmitter and as a receiver, and in that the scanning of the field of view of the focused laser pulses occurs in a coarse grid having a pattern established like a mesh network.

The above object is achieved, according to the present invention, in that the invention is based on the perception that the expense for scanning a given field of view can be minimized by employing an array of semiconductor lasers or, respectively, receiving detectors. Given such an arrangement, operating according to the laser radar principle with direct reception, a multitude of semiconductor laser diodes operating in a pulsed mode is therefore utilized as a radiation source for the transmitter of the laser range finder. Such semiconductor lasers have peak powers of about 100 W and have a high pulse repetition frequency (a few 10 kHz) and are well known in the art. They can be easily modulated, are small, lightweight and cost-effective, can be coupled to simple fiber optic components and can be easily integrated to form an array. These advantages can be exploited for reducing the pulse repetition frequency of the laser diodes and for reducing the scan mirror frequencies.

Moreover, these advantages are of significance both in terms of integration and formatting as well as with respect to size and weight of the arrangement. A further advantage in employing a semiconductor laser diode array for the transmitter of the laser range finder is that a multibeam laser radar having a plurality of radiation sources is therefore created for the scanning process. The arrangement of the present invention is therefore no longer dependent on the function and reliability of a single radiation source, i.e. the arrangement continues to remain operational even given the outage of individual radiation sources, this not being guaranteed given a scanning of a field of vision with the laser beam of a single laser transmitter and given the outage thereof. The scanning of the given field of view with such a multibeam laser radar can also be implemented at the cost of less time in comparison to a scanning with the laser beam of a single laser transmitter.

An array of receiving detectors is provided for the receiver of the laser range finder. These are preferably composed of photodiodes, for example Si diodes. This receiver technology can likewise be well adapted to the job with fiber optics and is also well known in the art per se.

Another basic idea of the arrangement constructed in accordance with the present invention may be seen in providing the image scanning shaped in the form of a mesh network. The constitutes a further measure for reducing the expense since such an image scanning can be implemented with a simple scanner structure as a consequence of scan mirror frequencies that can be kept low. Although a scanning pattern shaped in the form of a mesh network has gaps and generates fewer picture elements, it enables a shorter scan time and the reduction of laser diodes. Moreover, the mesh side of the scan pattern and the number of laser diodes can be optimally selected at any time taking the range area of the arrangement into consideration such that the obstacles to be recognized in accordance with the utilization of the arrangement can be recognized without further measures at a defined range which is defined by the user. This means that certain obstacles can be detected at a defined range, for example wires having a diameter of approximately 3 mm and at a range of approximately 300 m given a suitable selection of the mesh size and plurality of laser diodes.

According to a particular feature of the invention, the transmitter is formed of GaAs semiconductor laser diodes having a wavelength of $\lambda = 0.9$ $\mu$m.

According to another feature of the invention, the receiving detectors are composed of photodiodes, for example Si diodes.

According to another feature of the invention, and referring to the laser diodes and the photodiodes set forth above, the semiconductor laser diodes and the receiving detectors are arranged in the same configuration.

According to another feature of the invention, and with reference to the above-mentioned laser diodes and receiving detectors, the arrangement is particularly characterized in that the semiconductor laser diodes and the receiving detectors are coupled to fiber optic components.

According to another feature of the invention, the arrangement is particularly characterized in that the pulse width of the laser pulses of the semiconductor laser diodes is limited to a few nanoseconds (approximately 5-100 nsec).

According to another feature of the invention, the arrangement is particularly characterized in that the laser divergency of the semiconductor laser diodes lies at a few millirads, for example at approximately 1 mrad.

According to another feature of the invention, the arrangement is particularly characterized in that the mesh side of the scan pattern is selected dependent on the smallest selectable size of an obstacle that is still to be perceived at a defined range.

According to another feature of the invention, the arrangement is characterized in that the mesh size of the scan pattern is defined as 12 mrad.

According to another feature of the invention, the arrangement is particularly characterized in the network strips of the scan pattern are placed over the field of view, without gaps, at an angle of 45° relative to the azimuth.

According to another feature of the invention, the width of the mentioned network strips corresponds to the laser divergency of the semiconductor laser diodes.

According to another feature of the invention, the arrangement is particularly characterized in that the azimuth scanning occurs via a scan mirror and an image is generated at each scan over the azimuth.

According to another feature of the invention, the arrangement is particularly characterized in that the transmitter array and the receiver array are arranged in a coaxial system with a common front element in the form of a lens.

According to another feature of the invention, the arrangement is particularly characterized in that the field of view of the receiver is matched to the field of view of the transmitter with a common front element or lens.

According to another feature of the invention, the arrangement is particularly characterized in that the optical coupling of the transmission branch and the receiving branch into the coaxial system occurs with a beam splitter.

According to another feature of the invention, the arrangement is particularly characterized in that an azimuth scan mirror is arranged preceding the front element or lens, as viewed in the receiving direction.

According to another feature of the invention, the arrangement is particularly characterized in that the semiconductor laser diodes or, respectively, the receiving detectors are respectively arranged in at least two columns that are parallel to one another, in that the spacing of the semiconductor laser diodes or, respectively, of the receiving detectors of a column from one another corresponds to the mesh size, in that the spacing of the columns from one another is half the mesh size, and in that the semiconductor laser diodes or, respectively, the receiving detectors of each second column are offset in elevation by half a mesh size vis-a-vis the semiconductor laser diodes or, respectively, the receiving detectors of the neighboring columns.

According to another feature of the invention, the arrangement of the invention just set forth is particularly characterized in that the elevation angle is divided into a corresponding number of rows and one semiconductor laser diode is provided per row, the one semiconductor laser diode being conducted over the field of vision in a zig-zag pattern in azimuth across a few millirads with a microscan mirror.

According to another feature of the invention, the arrangement just set forth is particularly characterized in that the microscan occurs over a row height of half a mesh size.

According to another feature of the invention, the arrangement just set forth is particularly characterized in that the microscan mirror is arranged between the front element or lens and the beam splitter.

According to another feature of the invention, the arrangement just set forth and characterized is further characterized in particular, in that the scan frequency of the microscan mirror is defined by the ratio of the field angle in azimuth to the width of the microscan, i.e. the mesh size.

According to another feature of the invention, the arrangement set forth above is particularly characterized in that the focused laser pulses slightly overlap.

According to another feature of the invention, the arrangement set forth with respect to the spacing of the semiconductor laser diodes and receiving detectors is particularly characterized in that the semiconductor laser diodes or, respectively, the receiving detectors are respectively arranged under one another, without gaps, and without overlap in one or more columns that are parallel to one another.

According to another feature of the invention, the arrangement just set forth is particularly characterized in the mesh network-like scan pattern is generated by a corresponding control of the trigger time of the semiconductor laser diodes lying below one another in a column during the sweep over the azimuth.

According to another feature of the invention, the arrangement just set forth is further particularly characterized in that, respectively, one or more rows in the array of semiconductor laser diodes or, respectively, receiving detectors is (are) omitted and is (are) filled out by one or more interlace motions of a scan mirror.

According to another feature of the invention, the arrangement just set forth is particularly characterized in that the measured range value, the position value of the scan mirrors and the values for the chronological execution are processed in a signal processor and are combined to form an image of the overall seam from which the image of the obstacle is extracted and shown to the pilot.

When a laser range finder operating in the 10 $\mu$m range is employed, the expense for the laser components and for the optics again increases. The transmitting array in an arrangement of the present invention is therefore preferably formed of GaAs semiconductor laser diodes having the wavelength $\lambda=0.9$ $\mu$m. A laser radar having semiconductor laser diodes of this wavelength can be realized with considerably lower expense and more cost-effective than a laser radar operating in the 10 $\mu$m range. However, semiconductor lasers having a wavelength of 1.3 $\mu$m or 1.5 $\mu$m also come into consideration for an arrangement constructed in accordance with the present invention. Semiconductors in the 1.5 $\mu$m range have the advantage of complete eye reliability and cannot be detected by night vision devices.

The semiconductor laser diodes and the receiving detectors are advantageously coupled to fiber optic components. The advantage is thereby obtained that the semiconductor laser diodes and their drives, just like the receiving detectors can be arranged in an electronics box that is separated from the optical components of the arrangement, i.e. from the scanner and from the optics.

The pulse width of the laser pulses of the semiconductor laser diodes is advantageously limited to a few nanoseconds (approximately 5-100 nsec). The average power of the semiconductor laser diodes can be kept low on the basis of this measure and an adequate depth resolution of, for example, less than 5 m can be achieved at a pulse width of 30 nsec.

It is advantageous in an arrangement constructed in accordance with the present invention when the field of vision of the receiver is matched to that of the transmitter with a common front element or lens. The utilization of the same lens for the transmitter and the receiver is possible on the basis of a suitable selection of the dimensions of the semiconductor laser diodes and of the receiving detectors. However, by introducing a matching optics, it is also possible to employ semiconductor laser diodes and receiving detectors that are different in terms of their dimensions.

It is advantageous in view of the expense in the optical components when the transmitting array and the receiving array are arranged in the coaxial system having a common front lens. The optical coupling of the transmitting branch and the receiving branch into the coaxial system advantageously occurs with a beam splitter.

In accordance with a first advantageous embodiment of an arrangement constructed in accordance with the present invention, the semiconductor laser diodes or, respectively, the receiving detectors are each respectively arranged in at least two columns which lie parallel to one another, whereby the spacing of the semiconductor laser diodes or, respectively, of the receiving detectors of a column from one another corresponds to the mesh size; whereby, further, the spacing of the columns from one another is equal to half the width of a mesh and the semiconductor laser diodes or, respectively, the receiving detectors of each second column are offset by half the width of a mesh in elevation views of the semiconductor laser diodes or, respectively, the receiving detectors of the neighboring columns. The azimuth scanning thereby occurs via a scan mirror, whereby an image is produced at each scan over the azimuth. The elevation angle is thereby divided into a corresponding number of rows and a semiconductor laser diode is provided per row, this being guided over the field of view of a zig-zag pattern in azimuth across a few millirads with a microscan mirror. In such an arrangement, the scan pattern, shaped like a mesh network, can be produced with a simple scanner in one scan given a corresponding configuration of the transmitter array and of the receiver array.

In accordance with a second embodiment of an arrangement constructed in accordance with the present invention, the semiconductor laser diodes or, respectively, the receiving detectors, are arranged under one another, without gaps, and without overlap in, respectively, one or more columns which lie parallel to one another. The scan pattern, shaped like a mesh network, is thereby generated by a corresponding control of the trigger time of the semiconductor laser diodes lying under one another in a column, being generated during the sweep over the azimuth. The size of the mesh and the mesh angle, i.e. the angle of network strips of the scan pattern relative to the azimuth, can therefore be varied by varying the delay time between the individual laser pulses, i.e. can be electronically varied. A microscan mirror is not needed in this embodiment.

It is provided, in accordance with a further embodiment of the invention that, respectively, one or more rows in the array of the semiconductor laser diodes or, respectively, of the receiving detectors, are omitted and are filled out by one or more interlace motions of a scan mirror. The expense for semiconductor laser diodes or, respectively, receiving detectors, therefore, becomes lower and the transmitting array or, respectively, receiving array therefore becomes more simple. The pulse repetition frequency (PRF) of the semiconductor laser diodes and the scan frequency of the azimuth scan mirror must thereby, however, be increased in proportion to the number of interlace motions in order to avoid a higher time expenditure then in the embodiments set forth above. Generating the mesh network-like scan pattern and, therefore, the image formatting in this embodiment occur in two or more scans, whereby either the azimuth mirror is additionally moved in elevation by one mesh farther or, in preferred fashion, the microscan mirror is additionally moved in elevation. It can thereby occur under certain circumstances due to angular movements of, for example, a low-flying helicopter relative to the scene that the network meshes are not entirely closed.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
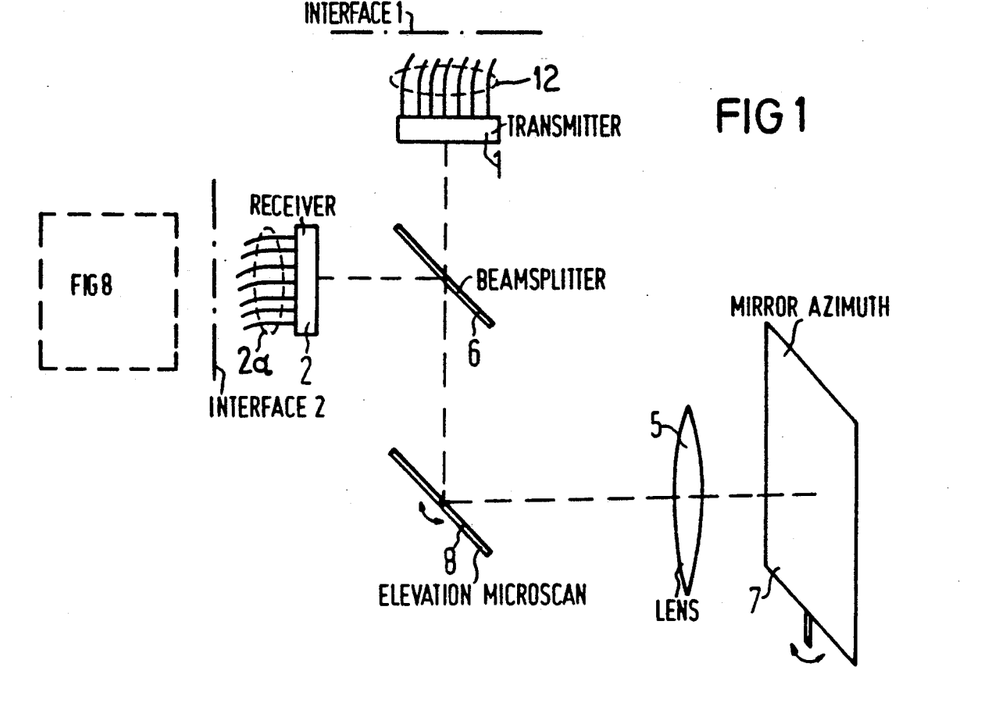
FIG. 1 is a schematic representation of an embodiment of an arrangement constructed in accordance with the present invention.
Figure 2:
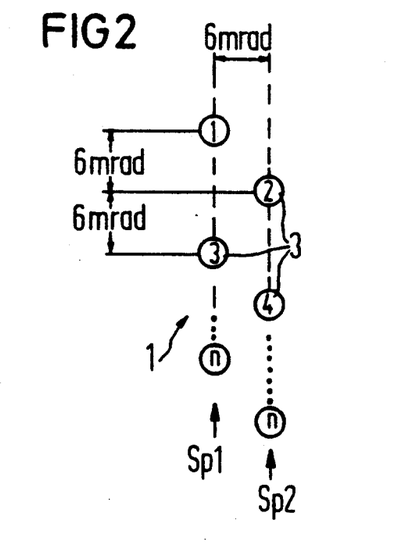
FIGS. 2 and 3 illustrate respective structures of a transmitting array or, respectively, a receiving array provided for the pulsed laser range finder of an arrangement constructed in accordance with the present invention.

Referring to FIG. 1, a laser radar having a pulsed laser range finder composed of a transmitter and a receiver and having a scanner with optics is illustrated. A respective array 1, a transmitter array in FIGS. 1 and 2 is illustrated as comprising semiconductor laser diodes 3 and, respectively, an array 2 (FIGS. 1 and 3) of receiving detectors 4 is provided to form the transmitter and the receiver. The transmitting array 1 is formed of GaAs semiconductor laser diodes 3 having the wavelength ($\lambda = 0.9$ μm). The semiconductor laser diodes 3 of the transmitting array 1 are coupled to optical fibers 1a and are configured to form the array indicated in FIG. 2. The receiving detectors 4 for the receiving array 2 are composed of photodiodes, for example Si diodes, and are likewise coupled to optical fibers 2a.

Figure 3:
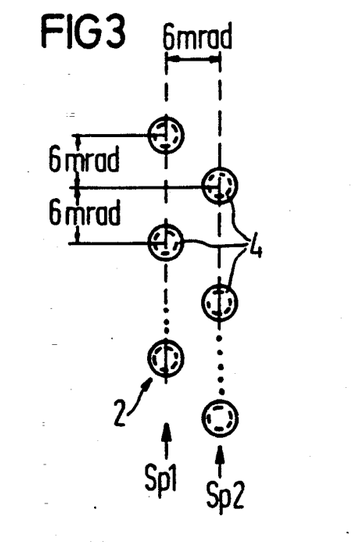

A respective receiving detector 4 of the receiver array 2 is assigned to a semiconductor laser diode 3 of the transmitting array 1, whereby the angular arrangement of the receiving array 2 corresponds to that of the transmitting array 1, i.e. the semiconductor laser diodes 3 and the receiving detectors 4 (as shown in FIGS. 2 and 3) are arranged in the same configuration that shall be set forth below in greater detail.

The transmitting array 1 and the receiving array 2 are arranged in a coaxial system with a common front lens 5 that matches the field of view of the receiver to that of the transmitter. A beam splitter 6 that couples the receiving branch into the transmitting branch or, respectively, out of the coaxial system is provided for the optical coupling of the transmitting branch and the receiving branch into the coaxial system. The scanner here is composed of a scan mirror 7 for azimuth scanning, as indicated by the arched double-headed arrow, the scan mirror 7 being arranged in front of the front lens 5 as viewed in the receiving direction and of a microscan mirror 8 for elevation scanning, as again indicated by an arched double-headed arrow, inserted into the coaxial system between the front lens 5 and the beam splitter 6.

Given a laser divergency of the semiconductor laser diodes 3 of 1 mrad, the arrangement of FIG. 1 works with a coarse grid scanning of the given field of view (for example, 30° in elevation and 60° in azimuth), since a surface-covering scan would result in an extremely-high number of picture elements and, therefore, high laser pulse repetition frequencies (PRF) or, respectively, scan mirror frequencies as well. In order to reduce the pulse repetition frequency PRF, a plurality of semiconductor laser diodes 3 and a plurality of receiving detectors 4 are employed.

Figure 4:
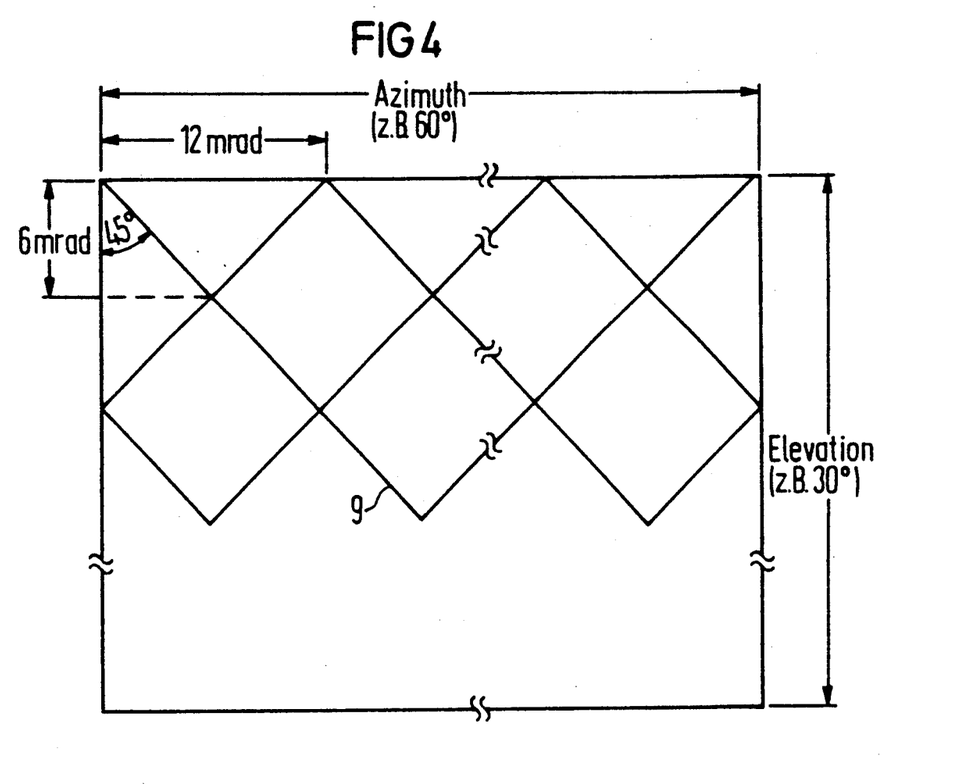
FIG. 4 is a graphic illustration of the scan pattern generated in the arrangement of FIG. 1.
Figure 5:
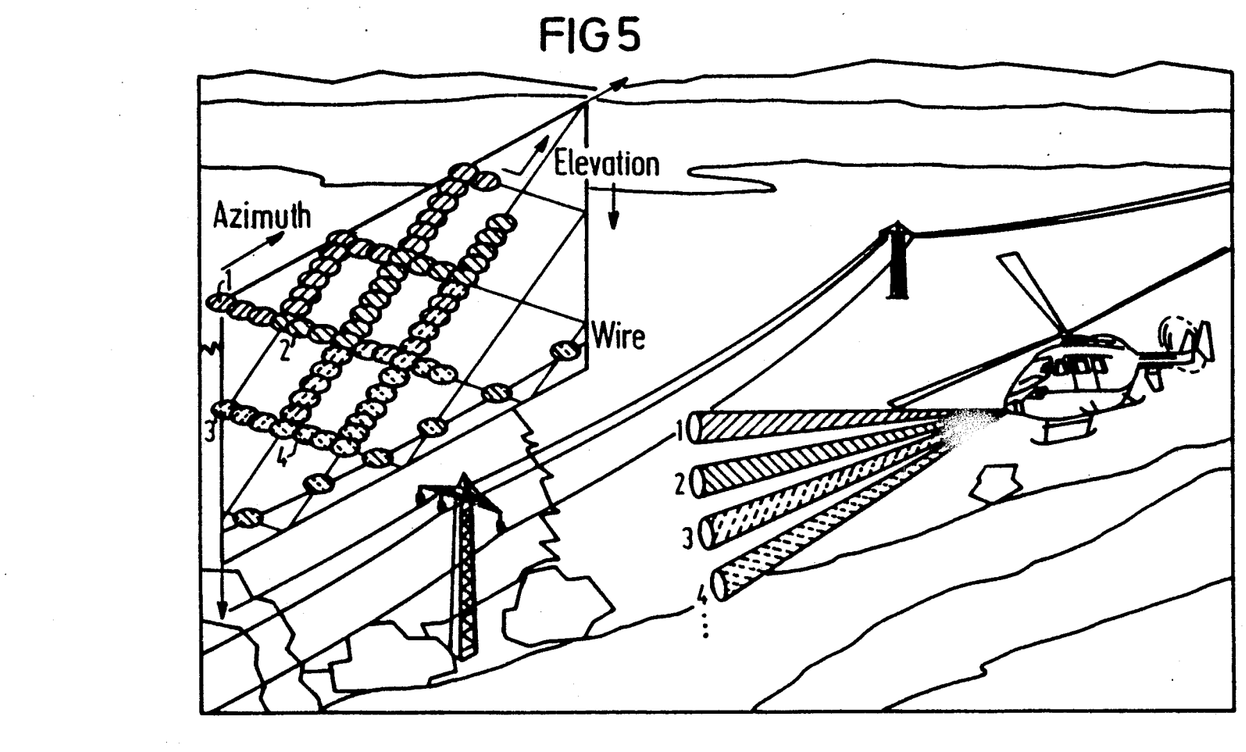
FIG. 5 is a pictorial representation of a low-flying helicopter having a flight path in which an overhead line is situated as an obstacle to be recognized, shown together with a portion of the scan pattern.

As shown in FIGS. 4 and 5, the field of view is scanned with a mesh network-like pattern, whereby the mesh size of the scan pattern is selected dependent on the smallest size to be detector for an obstacle still to be recognized at a defined range. For an obstacle having a diameter of approximately 3 mm that is still to be recognized at approximately 300 m, the mesh size amounts to, for example, 12 mrad, this corresponding to a resolution of 6 m at a range of 500 m. The width of the gap-free network strips 9 of the scan pattern placed over the field of view at an angle of 45° relative to the azimuth corresponds to the laser divergency of, for example, 1 mrad.

In order to then generate the mesh network-like scan pattern of FIGS. 4 and 5, the semiconductor laser diodes 3 and the receiving detectors 4 are configured in an appropriate manner to form the transmitting array 1 and, respectively, the receiving array 2. In accordance therewith, the semiconductor laser diodes 3 in FIG. 2 and the receiving detectors 4 in FIG. 3 are respectively arranged in at least two columns Sp1 and Sp2 that are parallel to one another, whereby the spacing of the semiconductor laser diodes 3 or, respectively, of the receiving detectors 4 within the columns Sp1 or, respectively, Sp2 is equal to the mesh size, i.e. equal to 12 mrad in the present example. The spacing of the columns Sp1 and Sp2 from one another is equal to half the mesh size, i.e. 6 mrad, whereby the semiconductor laser diodes 3 or, respectively, receiving detectors 4 of each second column, i.e. of the columns Sp2 and, potentially, Sp4, Sp6, etc., are offset in elevation by half a mesh width, i.e. by 6 mrad, with respect to the semiconductor laser diodes 3 or, respectively, the receiving detectors 4 of the neighboring columns, i.e. the columns Sp1 and, potentially, the columns Sp3, Sp5, etc.

The scanning of the field of view in elevation and azimuth than occurs with the assistance of the semiconductor laser diodes 3 configured in the transmitter array 1 according to FIG. 2, whereby the elevation angle is divided into a corresponding number of rows and a semiconductor laser diode 3 is provided per row. Each semiconductor laser diode 3 has its emission moved back and forth in elevation by a microscan shift over a small angle, i.e. over a few millirads. Given a mesh size of, for example, 12 mrad, the microscan occurs over a row height of half a mesh width, i.e. over 6 mrad. As can be particularly clearly seen in FIG. 5, the semiconductor laser diodes 3 have their emissions conducted over the field of view in a zig-zag pattern in azimuth in this manner. The aforementioned microscan mirror 8 is provided for the implementation of the microscan. Its scan frequency is defined by the ratio of the field angle in azimuth to the width of the microscan (mesh size). Given a 60° azimuth angle and a microscan width of 12 mrad, its scan frequency therefore amounts to, for example, 87 Hz. As already mentioned, the azimuth scanning occurs on the basis of the scan mirror 7 located in front of the optics, whereby an image is produced at each scan over the azimuth. The scan frequency of the azimuth scan mirror 7 is defined by the desired picture repetition frequency (for example, 5 Hz) and by the plurality of semiconductor laser diodes 3 or, respectively, of the receiving detectors 4 when these cover the entire field angle in elevation. Given an elevation angle of 30°, approximately 44 columns are required. Since, in this case, an image arises at each sweep over the seam, the scan frequency of the azimuth scan mirror then amounts to 2.5 Hz.

FIG. 5 illustrates a portion of the scan pattern described in a zig-zag line-by-line manner by the scanning semiconductor laser diodes 3 or, respectively, their focused laser pulses that is mesh network-like viewed overall and also shows the course of a wire obstacle, such as a high-tension power distribution system. Each zig-zag line is described by a semiconductor laser diode 3, namely by the semiconductor laser diode referenced "1" in the column Sp1 or, respectively, the semiconductor laser diode referenced "2" in the column Sp2 or, respectively, the semiconductor laser diode referenced "3" in the column Sp1 or, respectively, the semiconductor laser diode referenced "4" in the column Sp2, etc, in FIG. 2. As may be clearly seen from FIG. 5, the individual, focused laser pulses thereby overlap slightly, i.e. they overlap by 20% (equals an overlap factor of 0.8). The pulse repetition frequency PRF of the semiconductor laser diodes 3 results from the desired picture repetition frequency, from the azimuth angle to be scanned, from the laser divergency, from the angle of the microscan and from calculating in a certain overlap of the individual laser lobes. Given a picture rate of 5 Hz, an azimuth angle of 60°, a microscan angle of 45° and an overlap factor of 0.8, a pulse repetition frequency of, for example, 9.3 kHz results. This value can be realized with currently-available GaAs semiconductor laser diodes having the wavelength of 0.9 μm. The pulse width of the laser pulses is limited to a few nanoseconds, for example to 30 ns, in order to keep the average power of the semiconductor lasers low and in order to enable an adequate depth resolution of <5 m.

Figure 6:
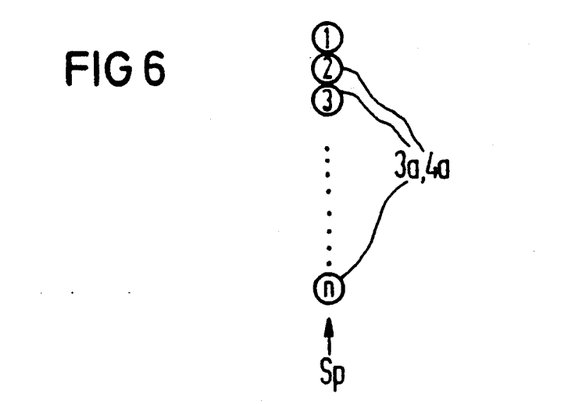
FIG. 6 schematically illustrates the structure of a transmitter or, respectively, receiver array.
Figure 7:
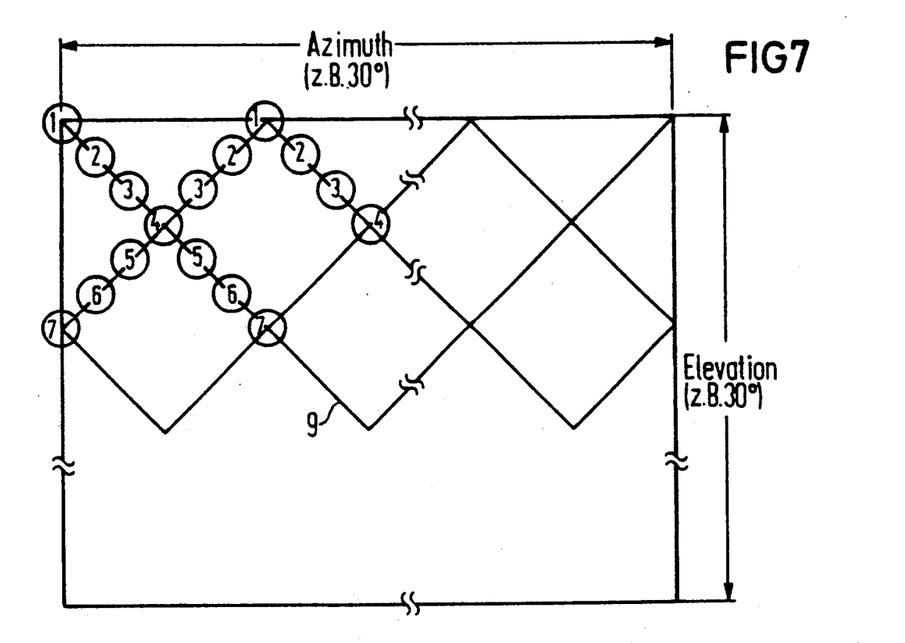
FIG. 7 is a graphic illustration of the scan pattern for the arrays of FIG. 6.

In another embodiment of the invention according to FIG. 6, the semiconductor laser diodes 3a and the receiving detectors 4a are respectively arranged below one another in a column Sp or in a plurality of columns which lie parallel to one another, being arranged therein without gaps and without overlap. The mesh network-like scan pattern (FIG. 7) is thereby generated in that the laser pulses are triggered at the proper time during the sweep over the azimuth. The mesh size and angle can thus be varied by varying the delay time between the individual laser pulses, i.e. can be electronically varied. In this case, the microscan mirror is not absolutely necessary.

In a modification of these two embodiments, respectively, one or more rows in the transmitting array or, respectively, in the receiving array can be omitted. These are then filled out by one or more interlace motions of a scan mirror, preferably of the microscan mirror 8.

Figure 8:
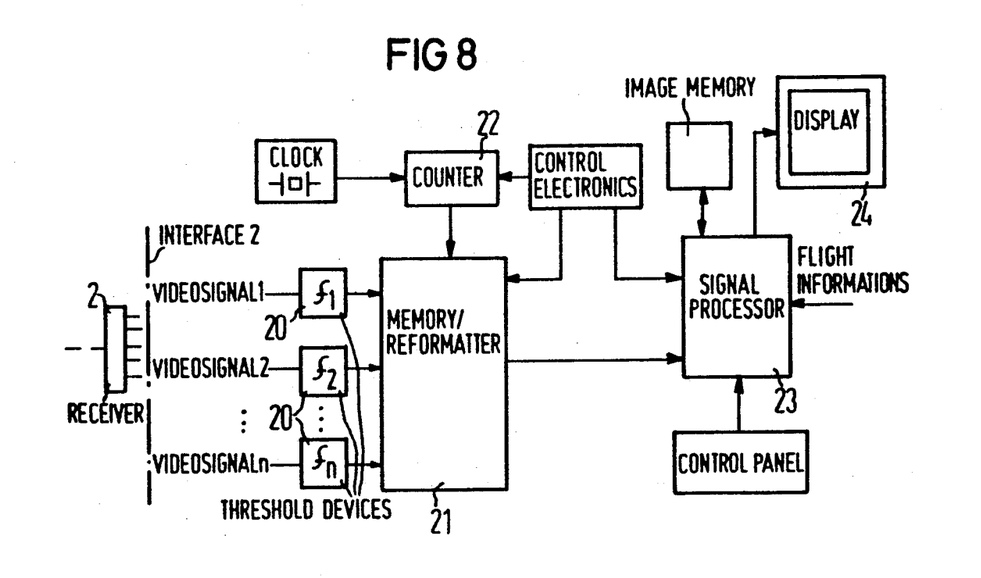
FIG. 8 is a schematic representation of an evaluation device which may be employed in practicing the present invention.

The signals of the measured range values acquired from the receiving detectors 4 are amplified with amplifiers matched to the laser pulse width and are then supplied to an evaluation device that begins at the interface of the arrangement identified in FIG. 1. The structure of the evaluation device is schematically illustrated in a block circuit diagram in FIG. 8. For evaluation, the video signals are first digitized via analog threshold devices 20 and are then converted into a continuous data stream in a memory/reformatter 21. A counter 22 evaluates the range. The methods known for range finder are thereby employed. The measured range values, the position values of the scan mirrors 7, 8 and the values for the chronological execution are then further processed in a signal processor 23. The signal processor 23 stores the information dependent on the range and combines such information to form an image. The picture of the obstacle is then extracted from this picture of the overall scene and is shown to the pilot on a display 24. Portrayals such as range marks, sensor functions, magnified image portions, device functions are the fade-in/involvement of flight data transmitted from the onboard computer are then possible in this image. Furthermore, the pictorial portrayal can also be assisted by intensity or color or, respectively, by acoustic or optical alarm signals.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In an arrangement for recognizing obstacles for pilots of low-flying aircraft, of the type having a pulsed laser range finder including a transmitter and a receiver for scanning a given field of view and a display, the improvement comprising:
    said transmitter being formed by a plurality of semiconductor laser diodes arranged in an array and means for operating said semiconductor laser diodes for establishing a scanned field of view of focused laser pulses from said semiconductor laser diodes in a coarse grid having a mesh-like scan pattern;
    said receiver being formed by a plurality of receiving detectors arranged in an array and means for operating said receiving detectors to receive reflections of the laser pulses and to generate received signals corresponding thereto; and
    means for generating a representation on said display, from said received signals, of the course of a recognized obstacle in said scanned field of view.

2. The improved arrangement of claim 1, wherein each of said semiconductor laser diodes is a GaAs semiconductor laser diode operable at a wavelength of $\lambda = 0.9$ $\mu$m.

3. The improved arrangement of claim 1, wherein each of said receiving detectors is a photodiode.

4. The improved arrangement according to claim 3, wherein each of said photodiodes is a Si diode.

5. The improved arrangement of claim 1, wherein said receiving detectors are arranged in the same array configuration as said semiconductor laser diodes.

6. The improved arrangement of claim 1, further comprising:
    first fiber optic means for coupling said semiconductor laser diodes to said means for operating said semiconductor laser diodes;
    means for generating an image on said display of the scanned field of view from signals from said receiving detectors; and
    second fiber optic means for coupling said receiving detectors to said means for generating an image.

7. The improved arrangement of claim 1, wherein said means for operating said semiconductor laser diodes comprises means for providing a duration for each of said laser pulses in the range of 5-100 nsec.

8. The improved arrangement of claim 1, wherein each of said semiconductor laser diodes is a semiconductor laser diode having a divergency of a few millirads.

9. The improved arrangement of claim 8 wherein each of said semiconductor laser diodes is a semiconductor laser diode having a divergency of approximately 1 mrad.

10. The improved arrangement of claim 1, wherein said means for operating includes means for selectively driving said semiconductor laser diodes to provide a mesh size of the scan pattern selected dependent on the smallest size of an obstacle that is to be perceived at a defined range.

11. The improved arrangement of claim 1, wherein said array is constructed and operated by said means for operating to provide a mesh size of the scan pattern of 12 mrad.

12. The improved arrangement of claim 1, wherein:
    said array is constructed and operated by said means for operating to provide a scan pattern of network strips over the field of view, said strips being without gaps and at an angle of 45° relative to azimuth.

13. The improved arrangement of claim 12, wherein each of said laser pulses has a divergency and wherein said means for operating provides a network strip which corresponds to the divergency of the laser pulses.

14. The improved arrangement of claim 1, further comprising means for azimuth scanning using said semiconductor laser diodes array, including a scan mirror for generating an image at each scan over the azimuth.

15. The improved arrangement of claim 1, wherein:

said semiconductor laser diode array and said receiving detector array are arranged in a coaxial system having a common front element, including a lens.

16. The improved arrangement of claim 15, wherein said lens has optical properties for matching the field of view of said receiver to the field of vision of the transmitter.

17. The improved arrangement of claim 15, further comprising a beam splitter optically coupling said transmitter and said receiver into said coaxial system.

18. The improved arrangement of claim 17, further comprising:
means for providing azimuth scanning using said semiconductor laser diode array, including a scan mirror for generating an image at each scan over the azimuth; and
wherein said scan mirror is arranged in front of said lens as viewed in the receiving direction.

19. The improved arrangement of claim 1, wherein said transmission means comprises a plurality of semiconductor laser diodes;
said plurality of receiving detectors is a plurality of photodiodes;
said semiconductor laser diodes are arranged in said array in at least two parallel columns;
said photodiodes are arranged in two parallel columns and parallel to said columns of semiconductor laser diodes;
said semiconductor laser diodes and said photodiodes are spaced within said columns such that the spacing of the semiconductor laser diodes from one another and the spacing of the photodiodes from one another corresponds to the mesh size of said scan pattern and the spacing of the columns from one another corresponds to half the mesh size; and
said semiconductor laser diodes and said photodiodes of every other column are offset in elevation by half a mesh size with respect to the semiconductor laser diodes or the photodiodes in the intervening column.

20. The improved arrangement of claim 19, wherein said field of view encompasses an elevation angle, and wherein
said semiconductor laser diodes in said columns also form a plurality of rows, with at least one semiconductor laser diode per row, said rows arranged to divide said elevation angle into a number of said rows; and
said transmitter further including a microscan mirror and means for operating said microscan mirror to move the laser pulse output of at least one semiconductor laser diode per row over the field of view in a zig-zag pattern in azimuth across a few millirads.

21. The improved arrangement of claim 20, wherein said means for operating said microscan mirror provides a scan over a row height of half a mesh size.

22. The improved arrangement of claim 20, further comprising:
a coaxial system in which said semiconductor laser diode array and said receiving detector array are arranged, said coaxial system having a common front element, including a lens;
a beam splitter optically coupling said transmitter and said receiver into said coaxial system; and
wherein said microscan mirror is arranged between said lens and said beam splitter.

23. The improved arrangement of claim 20, wherein said means for operating said microscan mirror operates said microscan mirror at a scan frequency defined by the ratio of the field angle in azimuth to the width of the mesh size.

24. The improved arrangement of claim 20, wherein means for operating said laser diodes provides focused laser pulses which slightly overlap.

25. The improved arrangement of claim 18, wherein:
said semiconductor laser diodes and said receiving detectors are respectively arranged in alternation without gaps and without overlap in at least two parallel columns.

26. The improved arrangement of claim 25, wherein said means for operating said semiconductor laser diodes includes trigger means for operating said semiconductor laser diodes in a column during the sweep over the azimuth to provide the mesh-like scan pattern.

27. The improved arrangement of claim 26, further comprising:
means for operating said scan mirror in an interlace scan motion over said columns.

28. The improved arrangement of claim 14, further comprising:
signal processor means coupled to said scan mirror, said receiving detectors and said means for operating said semiconductor laser diodes for forming an image of the overall scan from which said representation of said obstacle is extracted and illustrated to the pilot.

* * * * *